United States Patent
Swami et al.

(10) Patent No.: US 12,531,816 B2
(45) Date of Patent: Jan. 20, 2026

(54) METHOD AND APPARATUS FOR DISTRIBUTING PARALLEL CONNECTIONS OVER MULTIPLE NETWORK INTERFACES

(71) Applicant: Samsung Electronics Co., Ltd., Suwon-si (KR)

(72) Inventors: Bhagwan Dass Swami, Bangalore (IN); Ravish Kumar Kumawat, Bangalore (IN); Srihari Kuncha, Bangalore (IN); Sandeep Irlanki, Bangalore (IN); Shubham Sharma, Bangalore (IN); Anchal Srivastava, Bangalore (IN); Ravneet Kour, Bangalore (IN); Dharma Teja Nidamanuri, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/748,776

(22) Filed: Jun. 20, 2024

(65) Prior Publication Data
US 2025/0392552 A1 Dec. 25, 2025

(30) Foreign Application Priority Data
Oct. 18, 2023 (IN) .............................. 202341071097

(51) Int. Cl.
*H04L 47/70* (2022.01)
(52) U.S. Cl.
CPC .................................. *H04L 47/82* (2013.01)

(58) Field of Classification Search
None
See application file for complete search history.

(56) References Cited

U.S. PATENT DOCUMENTS

| | | | |
|---|---|---|---|
| 8,014,819 B2 | 9/2011 | Manousakis et al. | |
| 8,386,621 B2 | 2/2013 | Park et al. | |
| 10,469,341 B2 | 11/2019 | Gandhi | |
| 10,813,154 B2 | 10/2020 | Abraham et al. | |
| 2012/0057511 A1* | 3/2012 | Sivakumar | H04W 28/06 370/310 |

(Continued)

FOREIGN PATENT DOCUMENTS

EP 2 706 790 A1 3/2014

*Primary Examiner* — Chris Parry
*Assistant Examiner* — Abderrahmen Chouat
(74) *Attorney, Agent, or Firm* — Jefferson IP Law, LLP

(57) ABSTRACT

A method performed by a user equipment (UE), the method comprises identifying, based on a set of connection parameters, a plurality of parallel connections associated with an application for downloading or uploading of one or more contents; determining whether a bandwidth requirement of a connection included in the identified plurality of parallel connections is greater than a bandwidth threshold or not; in accordance with a determination that the bandwidth requirement of the connection is greater than the bandwidth threshold: detecting per-connection-speed (PCS) of the connection, and assigning the connection to a first network interface or a second network interface based on the detected PCS of the connection; and in accordance with a determination that the bandwidth requirement of the connection is not greater than the bandwidth threshold, assigning the connection to the second network interface.

20 Claims, 10 Drawing Sheets

(56) References Cited

U.S. PATENT DOCUMENTS

| | | | |
|---|---|---|---|
| 2016/0135144 A1* | 5/2016 | Tsai | H04W 52/0258 |
| | | | 455/553.1 |
| 2019/0132219 A1* | 5/2019 | Gandhi | H04L 12/5692 |
| 2019/0230422 A1* | 7/2019 | Hajimusa | H04B 1/401 |
| 2021/0092657 A1 | 3/2021 | Kanagarathinam et al. | |
| 2021/0093953 A1* | 4/2021 | Wang | A63F 13/45 |
| 2023/0060315 A1 | 3/2023 | Kanagarathinam et al. | |
| 2024/0380685 A1* | 11/2024 | Mayyuri | H04L 45/24 |

* cited by examiner

METHOD AND APPARATUS FOR DISTRIBUTING PARALLEL CONNECTIONS OVER MULTIPLE NETWORK INTERFACES

CROSS-REFERENCE TO RELATED APPLICATION(S)

This application is based on and claims priority under 35 U.S.C. § 119(a) of an Indian Patent Application number 202341071097, filed on Oct. 18, 2023, in the Indian Patent Office, the disclosure of which is incorporated by reference herein in its entirety.

BACKGROUND

1. Field

The disclosure relates to a field of wireless communication networks. More particularly, the disclosure relates to a method and an apparatus for distributing parallel connections over multiple network interfaces.

2. Description of Related Art

In recent years, advent of Multi-Interface Adaptive Distribution (MIAD) technique enables efficient and reliable communication among devices with different interfaces and protocols in a network. The MIAD technique dynamically selects an optimal interface according to network conditions and application requirements. The MIAD technique can be applied to various scenarios, such as distribution network communication and real-time video streaming.

In a non-limiting example, FIG. 1 illustrates an example scenario depicting a MIAD technique for handling multiple parallel connections, according to the related art.

Referring to FIG. 1, the user equipment (UE) 101 uses applications which create multiple parallel connections with the content server 103 via a network interface 105 for data communication, in order to speed up an uploading process or a downloading process. However, at one time the UE 101 can communicate with the server 103 via a single network interface from the available cellular or wireless fidelity (Wi-Fi) network. In a non-limiting example, applications such as Galaxy Store download content by dividing the content into multiple chunks and opening the multiple parallel connections for these chunks using the network interface 105. An available bandwidth of the network interface 105 is divided into the multiple parallel connections such that each connection gets an equal share of the available bandwidth. However, by dividing the overall bandwidth among the multiple parallel connections, an overall speed per connection slows down due to exhaustion of the bandwidth. Further, only one network interface of available interfaces is used and the other available interface is not utilized by the applications. Therefore, all connections are loaded on the single network interface. The usage of only the single network interface may affect the user experience and performance of the applications.

Furthermore, FIG. 2 illustrates an example scenario depicting a problem in multiple data subscription package utilization associated with a MIAD technique, according to the related art.

Referring to FIG. 2, a user has multiple user devices UE1 and UE2. The UE 1 is associated with data package 1 from a cellular network provider. The UE 2 is associated with data package 2 from the cellular network provider. However, the user can only access one cellular data network at any given time instance, either directly through the cellular connection or indirectly through a Hotspot feature. This limits the user's ability to enjoy high bandwidth applications such as video conferencing, video streaming, gaming, and others, which may require faster and more reliable data transmission than what a single cellular network can offer.

Furthermore, one or more problems associated with the MIAD technique include problems associated with network ping-pong during high congestion. The UE 101 comprises multiple applications that require simultaneous access to various types of data, such as video, audio, image, text, etc. The UE 101 also comprises multiple network interfaces, such as Wi-Fi, fifth generation (5G), cellular, etc. If the UE 101 is connected to the content server 103 via a Wi-Fi network and many connections are opened in parallel resulting in the degradation of connection performance, then the smart Wi-Fi feature may disconnect the Wi-Fi and start using the cellular network. Switching from the Wi-Fi to the cellular network may result in unnecessary cellular data cost for the user and underutilization of available Wi-Fi bandwidth. Further, the smart Wi-Fi feature checks the available Wi-Fi bandwidth, and the connectivity is switched back to the Wi-Fi. When the UE 101 is connected via the Wi-Fi connection, the user may face performance degradation and the smart Wi-Fi feature may again disconnect the Wi-Fi in order to provide cellular connectivity. Thus, the network ping-pong problem arises during the high congestion.

Furthermore, one or more problems associated with the MIAD technique of the related art also include problems associated with an identification of application priority and service priority. One of the features associated with network usage is Mobile Data Only (MDO) feature. The MDO feature allows the user to choose a cellular network as the preferred network for specific applications. The user can designate high-priority applications and access their services over the cellular network. However, not all services within an application have the same priority level, and the MDO feature does not distinguish between them. This results in high mobile data consumption and an increase in data cost. Moreover, the MDO feature does not provide an option to use an unlicensed Wi-Fi network for low-priority services while using the cellular network for high-priority services.

Additionally, techniques such as Multipath Transmission Control Protocol (MPTCP), download booster, and virtual private network (VPN)-based services were developed in order to maximize the network utilization. Further, these techniques involve server deployment and involve limited protocols. Also, the implementation of these techniques requires a significant cost requirement. Furthermore, none of these techniques is efficient enough to overcome the above-mentioned problems corresponding to the MIAD technique according to the related art.

Therefore, there lies a need for an improved method and an apparatus that can overcome all the above-discussed limitations and problems associated with handling of the parallel connections in a multiple network interface scenario.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for distributing parallel connections over multiple network interfaces.

Additional aspects will be set forth in part in the description which follows and, in part, will be apparent from the description, or may be learned by practice of the presented embodiments.

In accordance with an aspect of the disclosure, a method, performed by a user equipment (UE), for distributing parallel connections over multiple network interfaces is provided. The method includes identifying, based on a set of connection parameters, a plurality of parallel connections associated with an application for downloading or uploading of one or more contents. The method further includes classifying, based on a bandwidth requirement of each of the identified plurality of parallel connections, the identified plurality of parallel connections into one of a first category of connections and a second category of connections. Further, the method includes detecting per-connection-speed (PCS) of the first category of connections. Furthermore, the method includes assigning the first category of connections to one of a first network interface or a second network interface based on the detected PCS of the first category of connections. Further, the method includes assigning the second category of connections to the second network interface.

In one or more embodiments, the set of connection parameters includes at least an application unique identifier (UID), a connection protocol associated with a connection, a destination internet protocol (IP), a destination port, and an IP type associated with the connection.

In one or more embodiments, the method may include obtaining historical data associated with the identified plurality of parallel connections. The method may further include predicting the bandwidth requirement of each of the identified plurality of parallel connections based on the obtained historical data.

In one or more embodiments, the historical data includes, for each of the identified plurality of parallel connections, a record of the set of connection parameters, connection time, and amount of data transfer in past instances.

In one or more embodiments, the classifying of the identified plurality of parallel connections may include determining at least one first parallel connection among the identified plurality of parallel connections whose bandwidth requirement is greater than a threshold bandwidth value. The method may further include classifying the at least one first parallel connection into the first category of connections. Further, the method may include determining at least one second parallel connection among the identified plurality of parallel connections whose bandwidth requirement is less than the threshold bandwidth value. Further, the method may include classifying the at least one second parallel connection into the second category of connections.

In one or more embodiments, the classifying of the identified plurality of parallel connections may include determining the at least one first parallel connection among the identified plurality of parallel connections whose data consumption rate is greater than a threshold value. The method may further include classifying the at least one first parallel connection into the first category of connections. Further, the method may include determining the at least one second parallel connection among the identified plurality of parallel connections whose data consumption rate is less than the threshold value. Further, the method may include classifying the at least one second parallel connection into the second category of connections.

In one or more embodiments, the detecting of the PCS of the first category of connections may include detecting the PCS of the first category of connections over the first network interface. The method may further include detecting the PCS of the first category of connections over the second network interface.

In one or more embodiments, the assigning of the first category of connections to the first network interface or second network interface may include determining whether the detected PCS of the first category of connections over the second network interface is greater or less than the detected PCS of the first category of connections over the first network interface. The method may further include assigning the first category of connections to the second network interface based on a determination that the detected PCS of the first category of connections over the second network interface is greater than the detected PCS of the first category of connections over the first network interface.

In one or more embodiments, the assigning of the first category of connections to the first network interface or the second network interface may include assigning the first category of connections to the first network interface based on a determination that the detected PCS of the first category of connections over the second network interface is less than the detected PCS of the first category of connections over the first network interface.

In one or more embodiments, the first network interface includes a first Wi-Fi network or a first cellular network. The second network interface includes a second Wi-Fi network or a second cellular network.

In accordance with aspect of the disclosure, a UE is provided. The UE includes memory storing one or more computer programs, and one or more processors communicatively coupled to the memory. The one or more computer programs include computer-executable instructions that, when executed by the one or more processors individually or collectively, cause the UE to identify, based on a set of connection parameters, a plurality of parallel connections associated with an application for downloading or uploading of one or more contents. The one or more processors are further configured to classify, based on a bandwidth requirement of each of the identified plurality of parallel connections, the identified plurality of parallel connections into one of a first category of connections and a second category of connections. Further, the one or more processors are configured to detect PCS of the first category of connections. Further, the one or more processors are configured to assign the first category of connections to one of a first network interface or a second network interface based on the detected PCS of the first category of connections. Further, the one or more processors are configured to assign the second category of connections to the second network interface.

In embodiments, a method performed by a user equipment (UE) is provided. The method comprises identifying, based on a set of connection parameters, a plurality of parallel connections associated with an application for downloading or uploading of one or more contents; determining whether a bandwidth requirement of a connection included in the identified plurality of parallel connections is greater than a bandwidth threshold or not; in accordance with a determination that the bandwidth requirement of the connection is greater than the bandwidth threshold: detecting per-connection-speed (PCS) of the connection, and assigning the connection to a first network interface or a second network interface based on the detected PCS of the connection; and in accordance with a determination that the bandwidth requirement of the connection is not greater than the bandwidth threshold, assigning the connection to the second network interface.

In embodiments, a user equipment (UE) is provided. The UE comprises memory storing one or more instructions; and one or more processors communicatively coupled to the memory. The one or more instructions, when executed by the one or more processors individually or collectively, cause the UE to identify, based on a set of connection parameters, a plurality of parallel connections associated with an application for downloading or uploading of one or more contents, determine whether a bandwidth requirement of a connection included in the identified plurality of parallel connections is greater than a bandwidth threshold or not, in accordance with a determination that the bandwidth requirement of the connection is greater than the bandwidth threshold: detect per-connection-speed (PCS) of the connection, and assign the connection to a first network interface or a second network interface based on the detected PCS of the connection, and in accordance with a determination that the bandwidth requirement of the connection is not greater than the bandwidth threshold, assign the connection to the second network interface.

In embodiments, a non-transitory computer readable storage medium is provided. The non-transitory computer readable storage medium storis instructions that, when executed by at least one processor, cause a user equipment (UE) to identify, based on a set of connection parameters, a plurality of parallel connections associated with an application for downloading or uploading of one or more contents; determine whether a bandwidth requirement of a connection included in the identified plurality of parallel connections is greater than a bandwidth threshold or not; in accordance with a determination that the bandwidth requirement of the connection is greater than the bandwidth threshold: detect per-connection-speed (PCS) of the connection, and assign the connection to a first network interface or a second network interface based on the detected PCS of the connection; and in accordance with a determination that the bandwidth requirement of the connection is not greater than the bandwidth threshold, assign the connection to the second network interface.

Other aspects, advantages and salient features of the disclosure, will become apparent to those skilled in the art from the following detailed description, which, taken in conjunction with the annexed drawings, discloses various embodiments of the disclosure.

BRIEF DESCRIPTION OF THE DRAWINGS

The above and other, aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
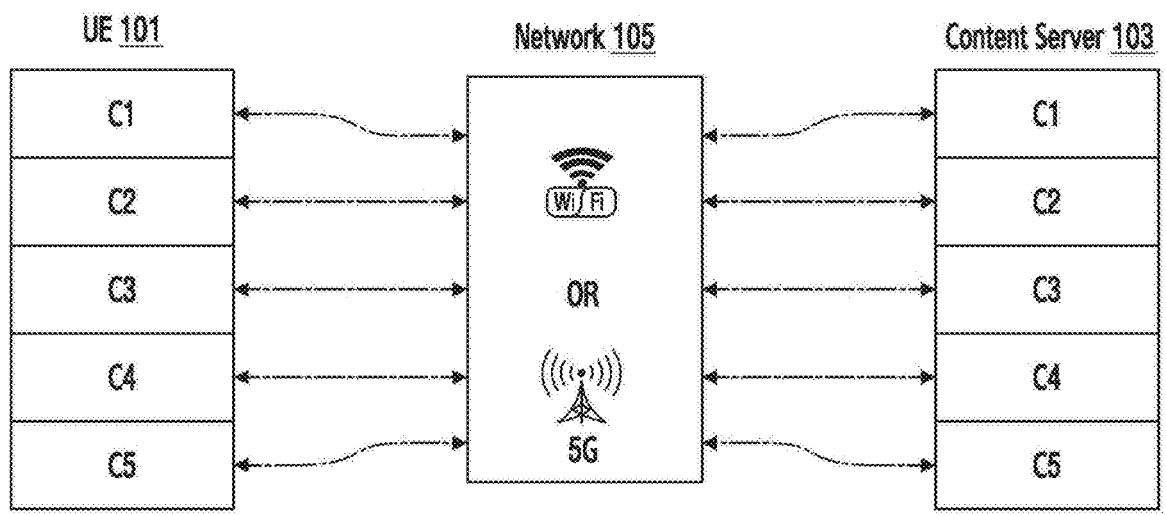
FIG. 1 illustrates an example scenario depicting a conventional MIAD technique for handling multiple parallel connections, according to the related art.
Figure 2:
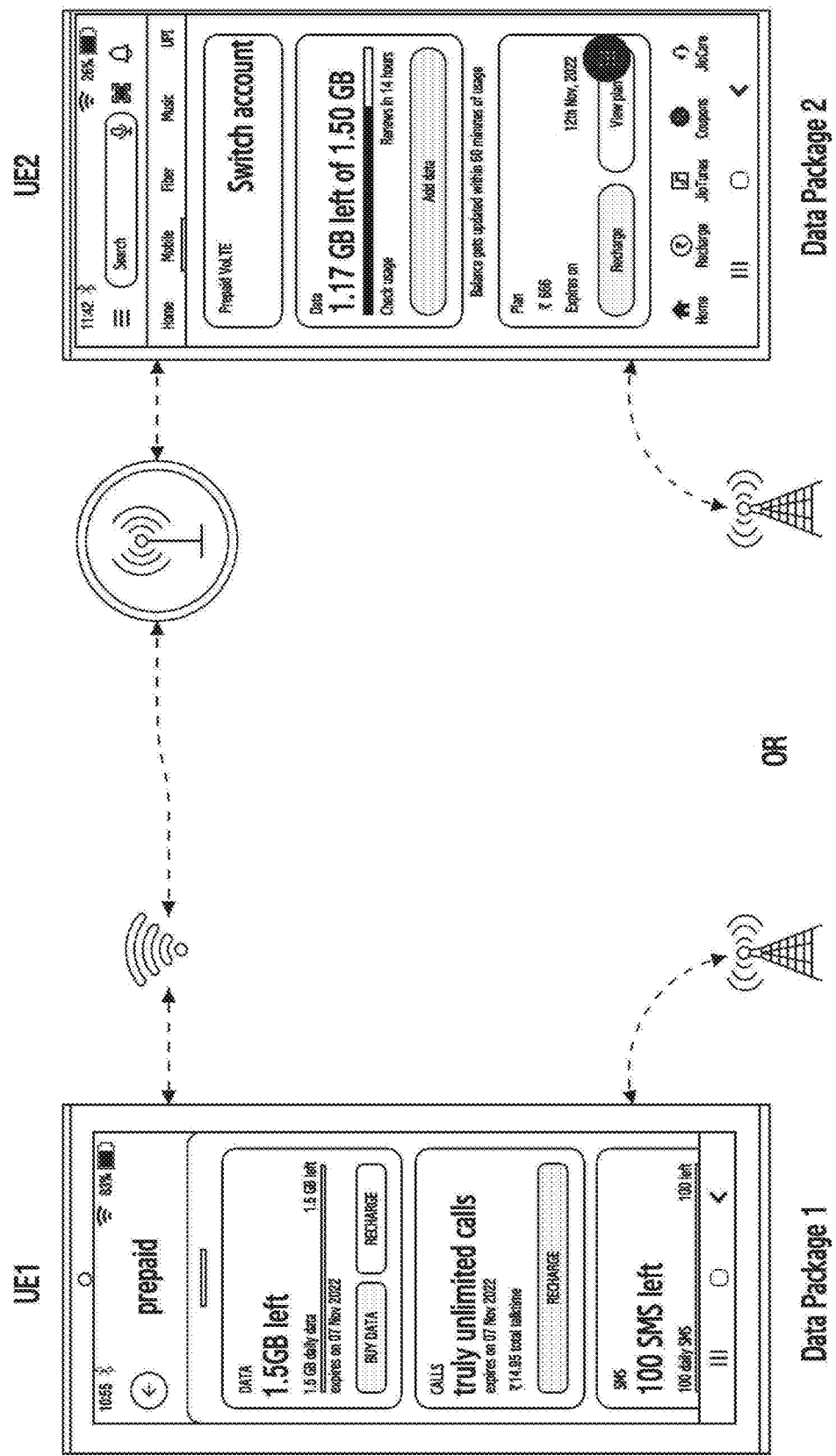
FIG. 2 illustrates an example scenario depicting a problem in multiple data subscription package utilization associated with the conventional MIAD technique, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", and similar language throughout this specification may, but do not necessarily, all refer to the same embodiment.

The terms "comprise", "comprising", "include", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components preceded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of modules that carry out a described function or functions. These modules, which may be referred to herein as units or blocks or the like, or may include blocks or units, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the disclosure will be described below in detail with reference to the accompanying drawings.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 3:
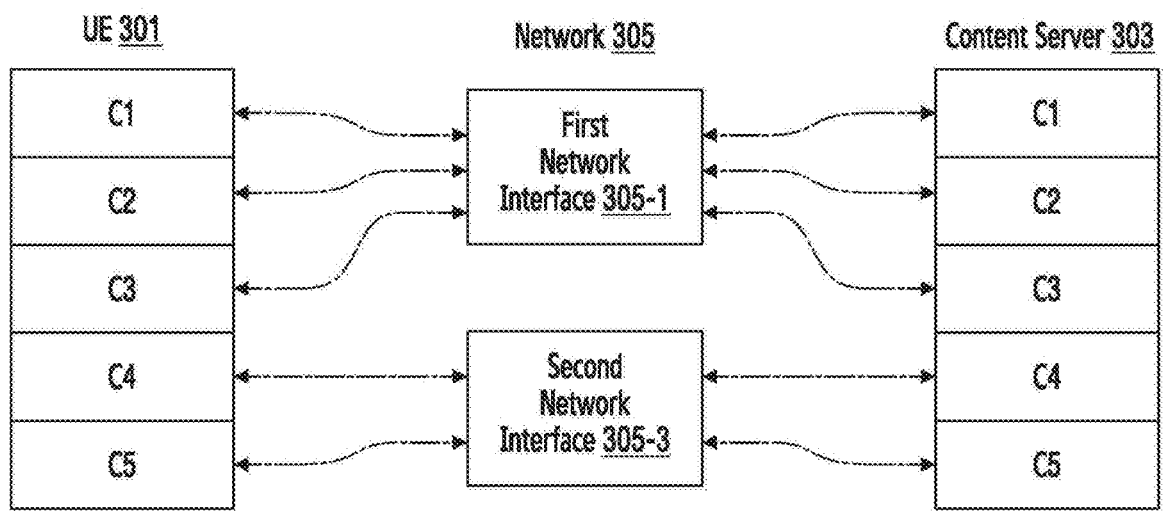
FIG. 3 illustrates a scenario depicting a distribution of parallel connections over multiple network interfaces, according to an embodiment of the disclosure.

FIG. 3 illustrates a scenario depicting a distribution of parallel connections over multiple network interfaces, according to an embodiment of the disclosure.

Referring to FIG. 3, a UE 301 is connected with a content server 303 via a network 305 (may also be referred to as "network interface 305"). The network interface 305 may include a first network interface 305-1 and a second network interface 305-3. The first network interface 305-1 may correspond to a first Wi-Fi network or a first cellular network. The second network interface 305-3 may correspond to a second Wi-Fi network or a second cellular network.

The UE 301 may include a plurality of applications (may also be referred to as "applications"). Each of the applications may open multiple parallel connections (may also be referred to as "a plurality of parallel connections") to download content among one or more contents from the content server 303. The UE 301 may identify the multiple opened parallel connections (for example, C1 to C5) and distribute the multiple parallel connections over both the first network interface 305-1 (for example, C1 to C3) and the second network interface 305-3 (for example, C4 and C5). The UE 301 aggregates the available bandwidth of each of the network interfaces i.e., the first network interface 305-1 and the second network interface 305-3, by distributing the multiple parallel connections over both the network interfaces and achieving a high download speed to download the content. The distribution of the multiple parallel connections over the first network interface 305-1 and the second network interface 305-3 is based on Per Connection Speed (PCS) of each parallel connection of the multiple parallel connections.

Figure 4:
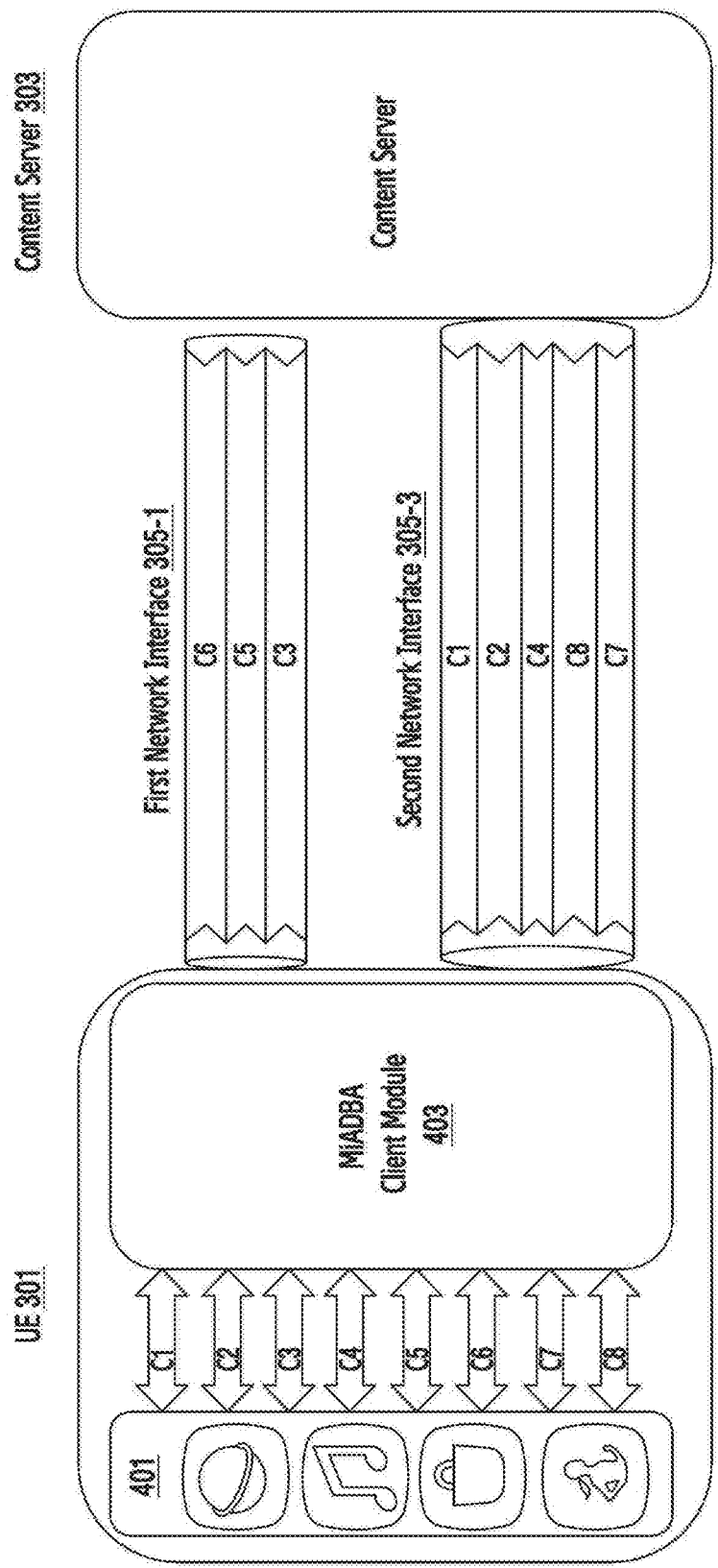
FIG. 4 illustrates a scenario depicting a Multi-Interface Adaptive Distribution and Bandwidth Aggregation (Mi-ADBA) client module for the distribution of the parallel connection over multiple available interfaces, according to an embodiment of the disclosure.

FIG. 4 illustrates a scenario depicting a Multi-Interface Adaptive Distribution and Bandwidth Aggregation (MiADBA) client module 403 for the distribution of the parallel connection over multiple available interfaces, according to an embodiment of the disclosure.

FIG. 4 is similar to that of FIG. 3 and only differs in terms of the MiADBA client module 403 of the UE 301 and an application interface 401 of the UE 301. A user associated with the UE 301 opens an application via the application interface 401. In a non-limiting example, the applications may include but are not limited to, shopping sites, a Galaxy store, a social networking application, or any other application that can open the multiple parallel connections. The user opens the plurality of applications, and the plurality of applications opens the multiple parallel connections. In a non-limiting example, the plurality of applications may open the multiple parallel connections from C1 to C8 as illustrated in the scenario shown in FIG. 4.

The MiADBA client module 403 distributes the multiple parallel connections of the plurality of applications over both network interfaces i.e., each of the first network interface 305-1 and the second network interface 305-3. As per the scenario shown in FIG. 4, the MiADBA client module 403 may redirect or route the parallel connections C3, C5, and C6 via the first network interface 305-1 and may redirect or route the parallel connections C1, C2, C4, C7, and C8 via the second network interface 305-3. Routing of the multiple parallel connections over the first network interface 305-1 and the second network interface 305-3 speeds up the download speed and aggregates the available bandwidth of each of the first network interface 305-1 and the second network interface 305-3.

In one or more embodiments, the plurality of applications is categorized at a parallel connection level rather than an application level. A high-priority connection may be routed over the first network interface 305-1. In a non-limiting example, the high-priority connection may be routed over a cellular network. Further, a low-priority connection may be routed over the second network interface 305-3. In a non-limiting example, the low-priority connection may be routed over a Wi-Fi network.

In one or more embodiments, the high-priority connection may be routed over the network interface that has high available bandwidth.

In one or more embodiments, the MiADBA client module 403 prioritizes the multiple parallel connections based on a bandwidth requirement that ranges from a low bandwidth requirement to a high bandwidth requirement. Further, the MiADBA client module 403 routes the connections among the multiple parallel connections which have high bandwidth requirements over the first network interface 305-1. Also, the MiADBA client module 403 routes the connections among the multiple parallel connections which have low bandwidth requirements over the second network interface 305-3.

Figure 5:
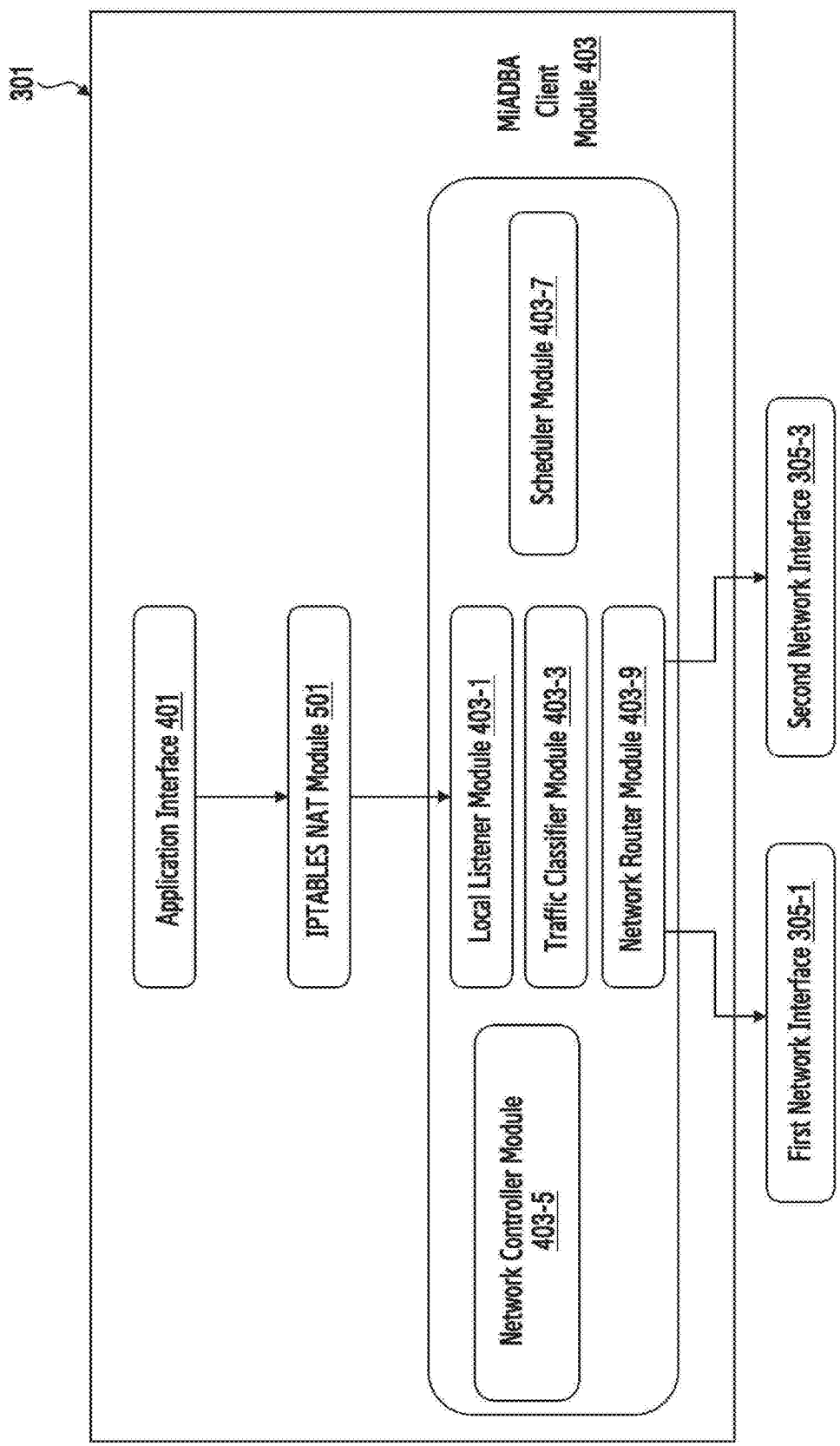
FIG. 5 illustrates a functional block diagram of a User Equipment (UE) for the distribution of the parallel connection over multiple available interfaces, according to an embodiment of the disclosure.

FIG. 5 illustrates a functional block diagram of the UE 301 for the distribution of the parallel connection over multiple available interfaces, according to an embodiment of the disclosure.

The UE 301 includes the application interface 401, an IPTABLES Network Address Translation (NAT) module 501, and the MiADBA client module 403. The MiADBA client module 403 includes a local listener module 403-1, a traffic classifier module 403-3, a network controller module 403-5, a scheduler module 403-7, and a network router module 403-9.

The application interface 401 is configured to provide an interface to the user to open the plurality of applications. The plurality of applications may open the plurality of parallel connections to download the content from the content server 303.

The IPTABLES NAT module 501 is configured to redirect the plurality of parallel connections to the local listener module 403-1. For instance, the IPTABLES NAT module 501 identifies the plurality of parallel connections associated with the applications for downloading or uploading the one or more contents and redirects the identified plurality of parallel connections to the local listener module 403-1. The identification of the plurality of parallel connections is based on a set of connection parameters. The set of connection parameters includes at least an application unique identifier (UID), a connection protocol associated with a connection, a destination Internet Protocol (IP), a destination port, and an IP type associated with the connection.

The local listener module 403-1 is configured to receive the plurality of parallel connections from the IPTABLES NAT module 501. The local listener module 403-1 is further configured to create connection instances for each connection of the plurality of parallel connections. The local listener module 403-1 is further configured to send the connection instance to the traffic classifier module 403-3.

The traffic classifier module 403-3 is configured to classify the plurality of parallel connections into one of a first category of connections and a second category of connections. The classification of the plurality of parallel connections is based on a bandwidth requirement of each of the plurality of parallel connections. The first category of connections are the connections for which the bandwidth requirement is greater than a threshold bandwidth value. The second category of connections are the connections for which the bandwidth requirement is less than the threshold bandwidth value.

In one or more embodiments, the traffic classifier module 403-3 may obtain historical data associated with the plurality of parallel connections. The traffic classifier module 403-3 may predict the bandwidth requirement of each of the plurality of parallel connections based on the obtained historical data. The historical data may comprise, for each of the plurality of parallel connections, a record of the set of connection parameters, a connection time, and an amount of data transfer in past instances. The detailed operation flow of the traffic classifier module 403-3 is provided herein below in conjunction with FIG. 6 of the drawings.

The network controller module 403-5 keeps information related to the available network interface among the first network interface 305-1 and the second network interface 305-3. The network controller module 403-5 is configured to monitor network information of the first network interface 305-1 and the second network interface 305-3. The network information includes information associated with Received signal strength indicator (RSSI), Reference Signal Received Power (RSRP), cellular network Radio Access Technology (RAT), Wi-Fi network Band, number of connections, Per Connection Speed (PCS) of each of the connection over the first network interface 305-1 and the second network interface 305-3. The network information is further utilized to measure network performance and to select an optimal network interface.

The scheduler module 403-7 is configured to select one of the first network interface 305-1 or the second network interface 305-3 based on the network information available with the network controller module 403-5 and connection information from the traffic classifier module 403-3. For instance, the scheduler module 403-7 may assign the first category of connections to one of the first network interface 305-1 or the second network interface 305-3 based on the PCS of the first category of connections.

In one or more embodiments, the scheduler module 403-7 ensures that the second network interface 305-3 is preferred if the second network interface 305-3 provides the required bandwidth. Further, it also ensures that the first network interface 305-1 is selected if the second network interface 305-3 does not provide the required bandwidth. In a non-limiting example, the first network interface 305-1 may correspond to the cellular network and the second network interface 305-3 may correspond to the Wi-Fi network. In another non-limiting example, the first network interface 305-1 may correspond to the first cellular network and the second network interface 305-3 may correspond to the second cellular network. Further, the scheduler module 403-7 also ensures that the PCS of the parallel connections does not degrade below a threshold level due to heavy parallel connection load. The detailed operation flow of the scheduler module 403-7 is provided herein below in conjunction with FIG. 7 of the drawings.

The network router module 403-9 gets a connection instance with one of the selected first network interface 305-1 or the second network interface 305-3. The network router module 403-9 ensures a connection of the UE 301 with the content server 303 for each connection instance and maintains a link between the UE 301 and the content server 303.

Figure 6:
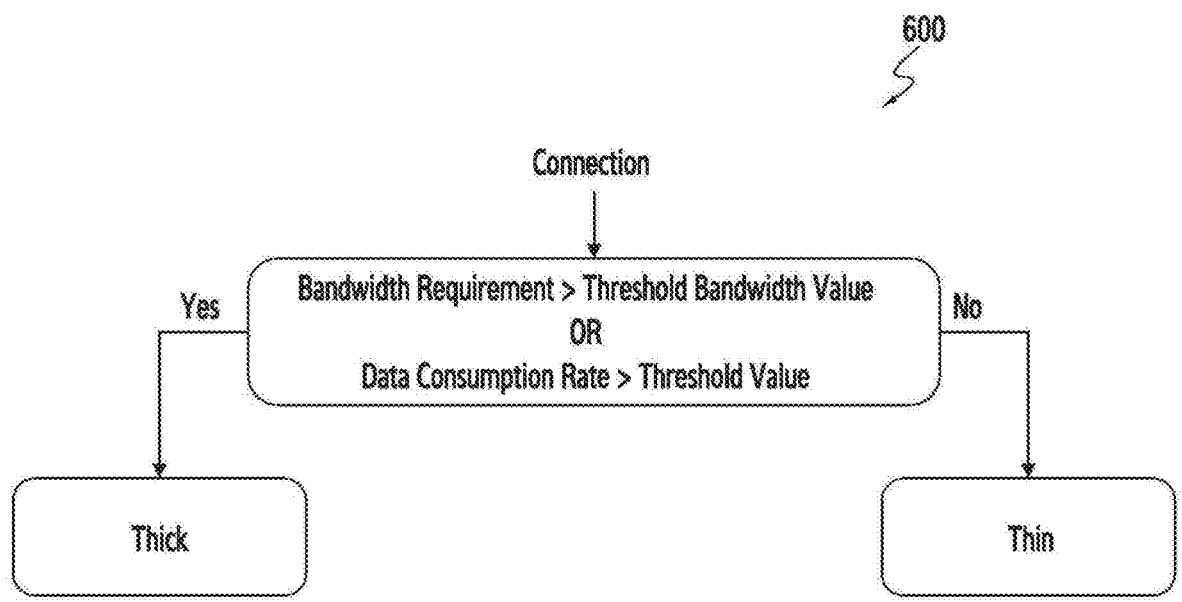
FIG. 6 illustrates a flow diagram depicting an operation performed by a traffic classifier module of the UE, according to an embodiment of the disclosure.

FIG. 6 illustrates a flow diagram 600 depicting an operation performed by the traffic classifier module 403-3 of the UE 301, according to an embodiment of the disclosure.

The traffic classifier module 403-3 determines at least one first parallel connection among the plurality of identified parallel connections whose bandwidth requirement is greater than the threshold bandwidth value. The traffic classifier module 403-3 further classifies the at least one first parallel connection into the first category of connections. The first category of connections is also called thick connections. Further, the traffic classifier module 403-3 determines at least one second parallel connection among the plurality of identified parallel connections whose bandwidth requirement is less than the threshold bandwidth value. The traffic classifier module 403-3 further classifies the at least one second parallel connection into the second category of connections. The second category of connections is also called thin connections.

Alternatively, the traffic classifier module 403-3 may determine at least one first parallel connection among the plurality of identified parallel connections whose data consumption rate is greater than a threshold value. The traffic classifier module 403-3 further classifies the at least one first parallel connection into the first category of connections. The first category of connections is also called the thick connections. Further, the traffic classifier module 403-3 determines at least one second parallel connection among the plurality of identified parallel connections whose data consumption rate is less than the threshold value. The traffic classifier module 403-3 further classifies the at least one second parallel connection into the second category of connections. The second category of connections is also called the thin connections.

Figure 7:
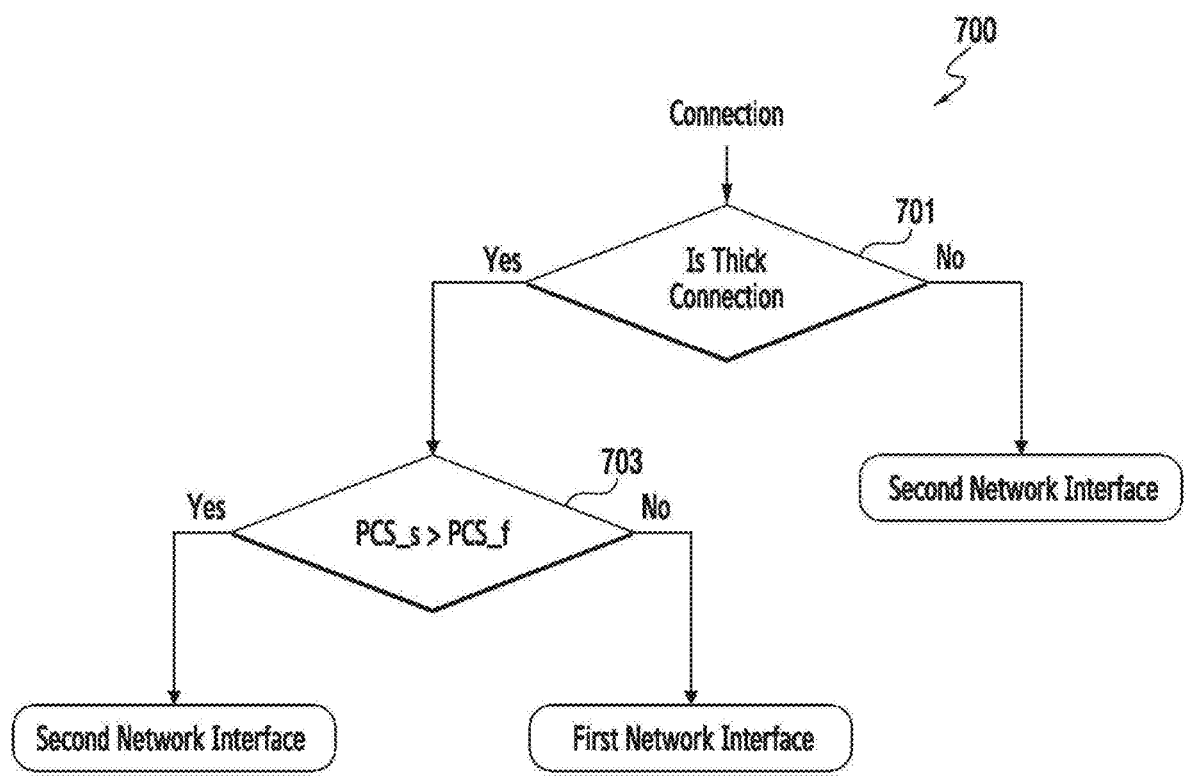
FIG. 7 illustrates a flow diagram depicting an operation performed by a scheduler module of the UE, according to an embodiment of the disclosure.

FIG. 7 illustrates a flow diagram 700 depicting an operation performed by the scheduler module 403-7 of the UE 301, according to an embodiment of the disclosure.

The scheduler module 403-7 receives the network information available with the network controller module 403-5. In addition, the scheduler module 403-7 receives the connection information from the traffic classifier module 403-3. At operation 701, the scheduler module 403-7 determines, based on the connection information received from the traffic classifier module 403-3, whether a connection among the plurality of parallel connections is classified into the first category of connection (or the thick connection). If it is determined by the scheduler module 403-7 that the connection is not classified into the first category of connection (or the thick connection), then the scheduler module 403-7 assigns the connection to the second network interface 305-3.

Further, if it is determined by the scheduler module 403-7 that the connection is classified into the first category of connection (or the thick connection), then the flow of operation of the flow diagram 700 moves to operation 703.

At operation 703, the scheduler module 403-7 detects the PCS of the first category of connections. For instance, the scheduler module 403-7 detects the PCS of the first category of connections over the first network interface 305-1 and the PCS of the first category of connections over the second network interface 305-3. Further, the scheduler module 403-7 determines whether the detected PCS of the first category of connections over the second network interface 305-3 is greater or less than the detected PCS of the first category of connections over the first network interface 305-1. Also, the scheduler module 403-7 assigns the first category of connections to the second network interface 305-3 if it is determined that the detected PCS of the first category of connections over the second network interface 305-3 is greater than the detected PCS of the first category of connections over the first network interface 305-1.

Furthermore, the scheduler module 403-7 may also assign the first category of connections to the first network interface 305-1 if it is determined that the detected PCS of the first category of connections over the second network interface 305-3 is less than the detected PCS of the first category of connections over the first network interface 305-1.

Figure 8:
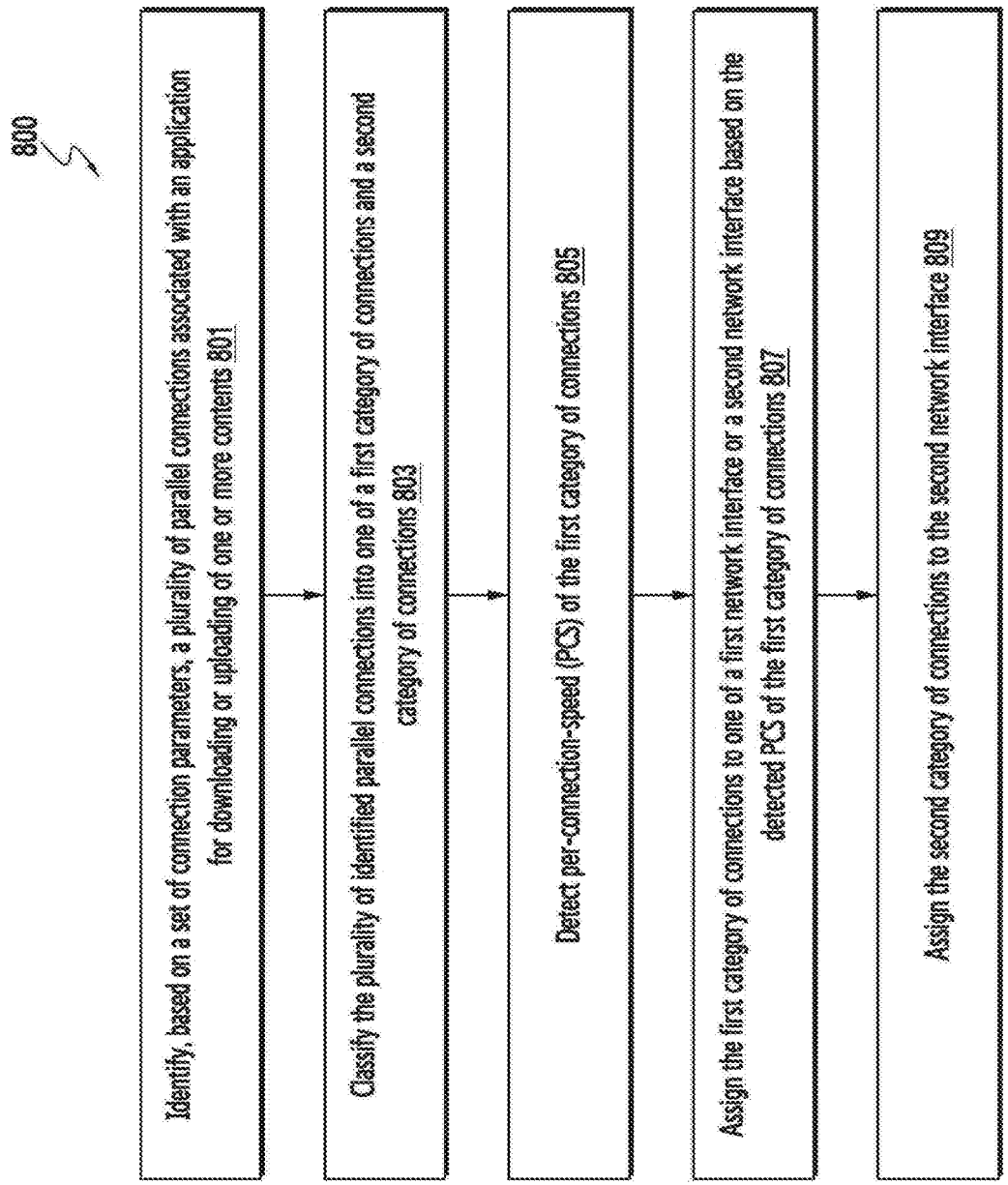
FIG. 8 illustrates a sequence flow diagram depicting a method for distributing the parallel connections over multiple network interfaces, according to an embodiment of the disclosure.

FIG. 8 illustrates a sequence flow diagram depicting a method 800 for distributing parallel connections over multiple network interfaces, according to an embodiment of the disclosure.

The method 800 includes a series of operations 801 through 809 performed by a processor 901 (as shown later in FIG. 9 of the drawings) of the UE 301. The processor 901 also performs each of the operations of the operations performed by different modules of the UE 301.

The flow of the method 800 starts at operation 801. At operation 801, the processor 901 identifies the plurality of parallel connections associated with an application for downloading or uploading of the one or more contents. The processor 901 may identify the plurality of parallel connections based on the set of connection parameters. The set of connection parameters includes at least the application UID, the connection protocol associated with the connection, the destination IP, the destination port, and the IP type associated with the connection. The flow of the method 800 now proceeds to operation 803.

At operation 803, the processor 901 classifies the plurality of identified parallel connections into one of the first category of connections and the second category of connections. The classification is based on the bandwidth requirement of each of the plurality of parallel connections. For instance, the processor 901 may obtain the historical data associated with the plurality of parallel connections. Thereafter, the processor 901 may predict the bandwidth requirement of each of the plurality of parallel connections based on the obtained historical data.

In one or more embodiments, the processor 901 may determine the at least one first parallel connection among the plurality of identified parallel connections whose bandwidth requirement is greater than the threshold bandwidth value and classify the at least one first parallel connection into the first category of connections. Furthermore, the processor 901 may determine the at least one second parallel connection among the plurality of identified parallel connections whose bandwidth requirement is less than the threshold bandwidth value and classify the at least one second parallel connection into the second category of connections. The flow of the method 800 now proceeds to operation 805.

At operation 805, the processor 901 detects the PCS of the first category of connections. For instance, the processor 901 may detect the PCS of the first category of connections over the first network interface 305-1 and detect the PCS of the first category of connections over the second network interface 305-3. The flow of the method 800 now proceeds to operation 807.

At operation 807, the processor 901 assigns the first category of connections to one of the first network interface 305-1 or the second network interface 305-3 based on the detected PCS of the first category of connections. For instance, the processor 901 may determine whether the detected PCS of the first category of connections over the second network interface 305-3 is greater or less than the detected PCS of the first category of connections over the first network interface 305-1. The processor 901 may assign the first category of connections to the second network interface 305-3 based on the determination that the detected PCS of the first category of connections over the second network interface 305-3 is greater than the detected PCS of the first category of connections over the first network interface 305-1. The processor 901 may also assign the first category of connections to the first network interface 305-1 based on the determination that the detected PCS of the first category of connections over the second network interface 305-3 is less than the detected PCS of the first category of connections over the first network interface 305-1. The flow of the method 800 now proceeds to operation 809.

At operation 809, the processor 901 may assign the second category of connections to the second network interface 305-3.

Figure 9:
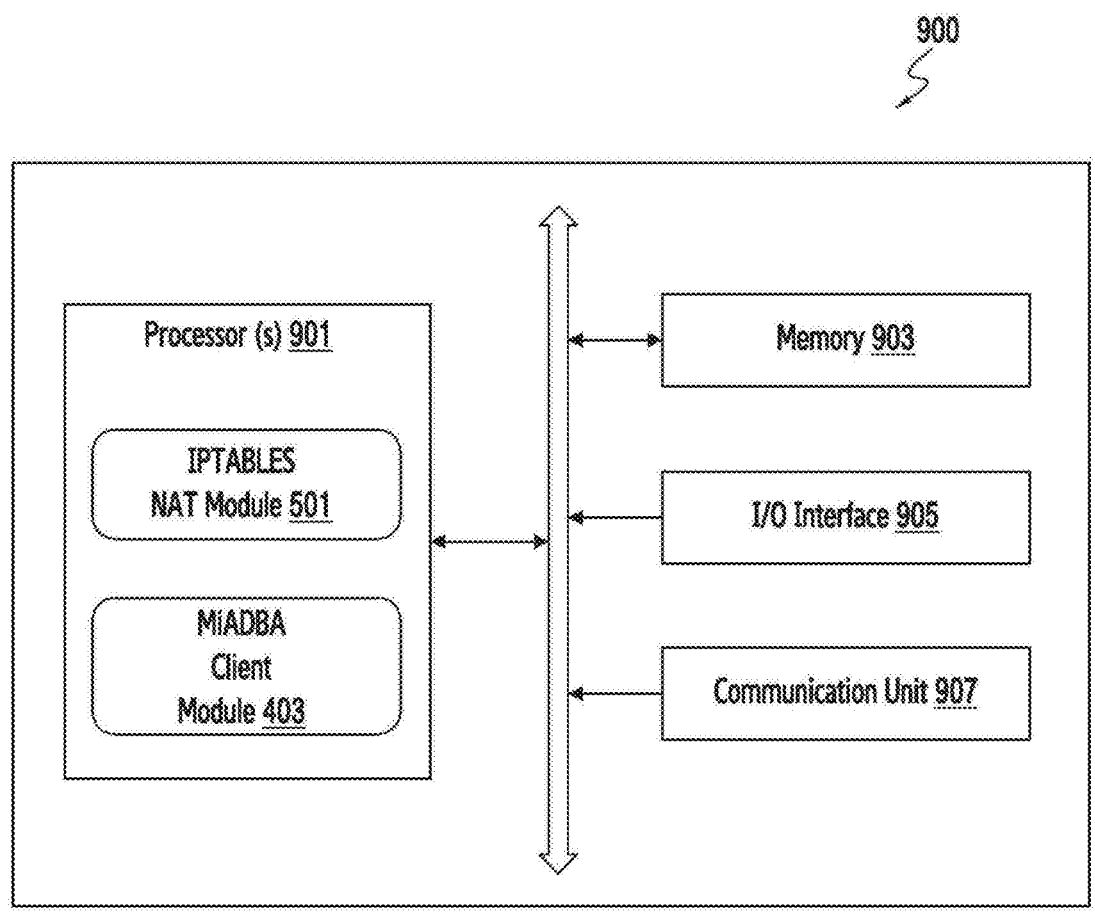
FIG. 9 illustrates a hardware configuration of the UE for the distribution of the parallel connection over multiple available interfaces, according to an embodiment of the disclosure.

FIG. 9 illustrates a hardware configuration 900 of the UE 301 for the distribution of the parallel connection over multiple available interfaces, according to an embodiment of the disclosure.

The UE 301 includes the processor(s) 901 (may also be referred to as "one or more processors 901"), a memory 903, an input/output interface 905, and a communication unit 907.

The processor 901 may be communicatively coupled with the memory 903. The processor 901 can be a single processing unit or several units, all of which could include multiple computing units. The processor 901 may be implemented as one or more microprocessors, microcomputers, microcontrollers, digital signal processors, central processing units, state machines, logic circuitries, and/or any devices that manipulate signals based on operational instructions. Among other capabilities, the processor 901 is configured to fetch and execute computer-readable instructions and data stored in the memory 903.

The processor 901 includes the IPTABLES NAT module 501 and the MiADBA client module 403 as disclosed in FIG. 5, a detailed explanation of which is omitted herein for the sake of brevity of the disclosure.

The memory 903 includes one or more computer-readable storage media. The memory 903 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache.

The memory 903 may be communicatively coupled with the processor 901 and may further include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In one or more embodiments, the input/output (I/O) interface 905 refers to hardware or software components that enable communication between the UE 301 and the content server 303. The I/O interface 905 serves as a communication medium for exchanging information, commands, or content with the other devices or systems. The I/O interface 905 may be a part of the processor 901 or maybe a separate component. The I/O interface 905 may be created in software or maybe a physical connection in hardware. The I/O interface 905 may be configured to provide a connection with the content server 303, an external network, external media, the display, or any other components, or combinations thereof. The external network may be a physical connection, such as a wired Ethernet connection, or may be established wirelessly.

The communication unit 907 is configured to facilitate the Wi-Fi connection and the cellular connection of the UE 301 with the content server 303. The communication unit 907 may include a Wi-Fi router and a modem for connection with the Wi-Fi network and the cellular network. The communication unit 907 is configured to communicate voice, video, audio, images, or any other digital media content over a communication network. Further, the communication unit 907 may include a communication port or a communication interface for uploading and downloading the content by the UE 301 via the communication network. The communication port or the communication interface may be a part of a processing unit or may be a separate component. The communication port may be created in software or may be a physical connection in hardware. The connection with the communication network may be a physical connection, such as a wired Ethernet connection, or may be established wirelessly as discussed above.

Figure 10:
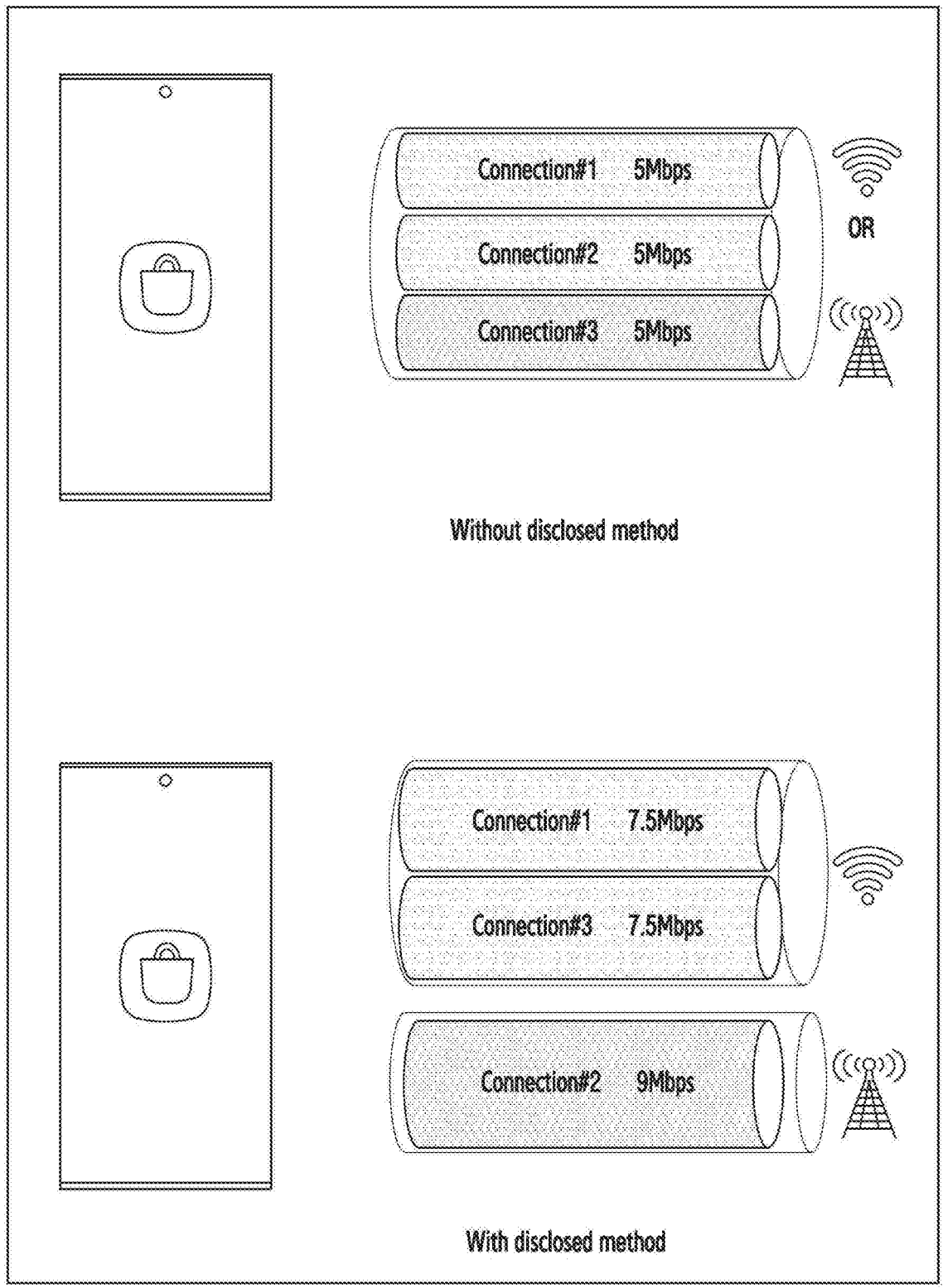
FIG. 10 illustrates a use case example scenario where three parallel connections are open to download an application, according to an embodiment of the disclosure.

FIG. 10 illustrates an example use case scenario where three parallel connections are open to download an application, according to an embodiment of the disclosure.

In the example use case scenario as shown in FIG. 10, it can be seen that the user is opening an application which opens three parallel connections. Each connection downloads ⅓ part of the content. For example, the first network interface 305-1 comprises the cellular network and the second network interface 305-3 comprises the Wi-Fi network. Also, for example, the Wi-Fi offers 15 MBPS and the cellular network offers a bandwidth of 9 MBPS. Also, for example, each connection needs to download more than 10 MBPS, and the connection downloading more than 10 MBPS is considered to be a thick connection.

In this scenario, without the disclosed method each connection will be assigned the Wi-Fi network as the Wi-Fi offers higher bandwidth and the bandwidth divides in each connection. Therefore, each of the three connections would get a bandwidth of 5 MBPS which would result in performance degradation of the Wi-Fi network.

On the contrary, with the above-disclosed methods as shown in FIGS. 3 through 8, for the first connection, PCS_w is 15/1=15 and PCS_c is 9/1=9. Therefore, the Wi-Fi network will be assigned to the first connection. Thereafter, for the second connection PCS_w is 15/(1+1)=7.5 and PCS_c is 9/1=9. Therefore, the cellular connection will be assigned to the second connection. Thereafter, for the third connection PCS_w is 15/(1+1)=7.5 and PCS_c is 9/(1+1)=4.5. Therefore, the Wi-Fi network will be assigned to the third connection. Thus, using the above-disclosed methods of the disclosure, the parallel connections can be easily distributed over both the Wi-Fi network and the cellular network. Therefore, the above-disclosed methods effectively help in utilizing the available bandwidth of both network interfaces and provide aggregated bandwidth with a higher aggregation rate.

In embodiments, a method performed by a user equipment (UE) is provided. The method comprises identifying, based on a set of connection parameters, a plurality of parallel connections associated with an application for downloading or uploading of one or more contents; determining whether a bandwidth requirement of a connection included in the identified plurality of parallel connections is greater than a bandwidth threshold or not; in accordance with a determination that the bandwidth requirement of the connection is greater than the bandwidth threshold: detecting per-connection-speed (PCS) of the connection, and assigning the connection to a first network interface or a second network interface based on the detected PCS of the connection; and in accordance with a determination that the bandwidth requirement of the connection is not greater than the bandwidth threshold, assigning the connection to the second network interface.

For example, the set of connection parameters includes at least an application unique identifier (UID), a connection protocol associated with a connection, a destination internet protocol (IP), a destination port, and an IP type associated with the connection.

For example, the method comprises obtaining historical data associated with the connection; and obtaining the bandwidth requirement of the connection based on the obtained historical data.

For example, the historical data includes, for each of the identified plurality of parallel connections, a record of the set of connection parameters, connection time, and amount of data transfer in past instances.

For example, the method comprises determining at least one first parallel connection among the identified plurality of parallel connections whose bandwidth requirement is greater than the bandwidth threshold; classifying the at least one first parallel connection into a first category of connections; determining at least one second parallel connection among the identified plurality of parallel connections whose bandwidth requirement is not greater than the bandwidth threshold; and classifying the at least one second parallel connection into a second category of connections.

For example, the method comprises determining at least one first parallel connection among the identified plurality of parallel connections whose data consumption rate is greater than a threshold value; classifying the at least one first parallel connection into a first category of connections; determining at least one second parallel connection among the identified plurality of parallel connections whose data consumption rate is less than the threshold value; and classifying the at least one second parallel connection into a second category of connections.

For example, the detecting of the PCS of the connection comprises obtaining a first value of the PCS of the connection over the first network interface; and obtaining a second value of the PCS of the connection over the second network interface.

For example, the assigning of the connection to the first network interface or the second network interface comprises: determining whether the second value of the PCS of the connection over the second network interface is greater than the first value of the PCS of the connection over the first network interface or not; in accordance with a determination that the second value of the PCS of the connection over the second network interface is greater than the first value of the PCS of the connection over the first network interface, assigning the connection to the second network interface; and in accordance with a determination that the second value of the PCS of the connection over the second network interface is not greater than the first value of the PCS of the connection over the first network interface, assigning the connection to the first network interface.

For example, the method comprises, for mobile data consumption, data cost caused by the first network interface is higher than data cost caused by the second network interface.

For example, the first network interface supports communication on cellular network, and the second network interface supports communication on wireless fidelity (Wi-Fi) network.

In embodiments, a user equipment (UE) is provided. The UE comprises memory storing one or more instructions; and one or more processors communicatively coupled to the memory. The one or more instructions, when executed by the one or more processors individually or collectively, cause the UE to identify, based on a set of connection parameters, a plurality of parallel connections associated with an application for downloading or uploading of one or more contents, determine whether a bandwidth requirement of a connection included in the identified plurality of parallel connections is greater than a bandwidth threshold or not, in accordance with a determination that the bandwidth requirement of the connection is greater than the bandwidth threshold: detect per-connection-speed (PCS) of the connection, and assign the connection to a first network interface or a second network interface based on the detected PCS of the connection, and in accordance with a determination that the bandwidth requirement of the connection is not greater than the bandwidth threshold, assign the connection to the second network interface.

For example, the set of connection parameters includes at least an application unique identifier (UID), a connection protocol associated with a connection, a destination internet protocol (IP), a destination port, and an IP type associated with the connection.

For example, the one or more instructions, when executed by the one or more processors individually or collectively, cause the UE to obtain historical data associated with the identified plurality of parallel connections, and obtain the bandwidth requirement of the connection based on the obtained historical data.

For example, the historical data includes, for each of the identified plurality of parallel connections, a record of the set of connection parameters, connection time, and amount of data transfer in past instances.

For example, the one or more instructions, when executed by the one or more processors individually or collectively, cause the UE to determine at least one first parallel connection among the identified plurality of parallel connections whose bandwidth requirement is greater than the bandwidth threshold, classify the at least one first parallel connection into a first category of connections, determine at least one second parallel connection among the identified plurality of parallel connections whose bandwidth requirement is less than the bandwidth threshold, and classify the at least one second parallel connection into a second category of connections.

For example, to detect the PCS of the connection, the one or more instructions, when executed by the one or more processors individually or collectively, cause the UE to obtain a first value of the PCS of the connection over the first network interface, and obtain a second value of the PCS of the connection over the second network interface.

For example, to assign the connection to the first network interface or the second network interface, the one or more instructions, when executed by the one or more processors individually or collectively, cause the UE to determine whether the second value of the PCS of the connection over the second network interface is greater than the first value of the PCS of the connection over the first network interface or not; in accordance with a determination that the second value of the PCS of the connection over the second network interface is greater than the first value of the PCS of the connection over the first network interface, assign the connection to the second network interface; and in accordance with a determination that the second value of the PCS of the connection over the second network interface is not greater than the first value of the PCS of the connection over the first network interface, assign the connection to the first network interface.

For example, the method comprises, for mobile data consumption, data cost caused by the first network interface is higher than data cost caused by the second network interface.

For example, the first network interface supports communication on cellular network, and the second network interface supports communication on wireless fidelity (Wi-Fi) network.

In embodiments, a non-transitory computer readable storage medium is provided. The non-transitory computer readable storage medium storis instructions that, when executed by at least one processor, cause a user equipment (UE) to identify, based on a set of connection parameters, a plurality of parallel connections associated with an application for downloading or uploading of one or more contents; determine whether a bandwidth requirement of a connection included in the identified plurality of parallel connections is greater than a bandwidth threshold or not; in accordance with a determination that the bandwidth requirement of the connection is greater than the bandwidth threshold: detect per-connection-speed (PCS) of the connection, and assign the connection to a first network interface or a second network interface based on the detected PCS of the connection; and in accordance with a determination that the bandwidth requirement of the connection is not greater than the bandwidth threshold, assign the connection to the second network interface.

Now, referring to the technical effect and abilities of the disclosure, the above-disclosed method provides various advantages including enabling a UE to utilize different networks for the same application without any server or application side change. Additionally, the above-disclosed method provides the UE side solution to aggregate the bandwidth of multiple networks and enables customers to utilize multiple data subscriptions concurrently and achieve a higher bandwidth. Also, the above-disclosed method does not require any change at the hotspot provider device for aggregation.

Further, the above-disclosed method focuses on service/connection priority (CP) rather than application priority. High-priority services are given preferences to utilize an optimal network instead of any fixed cellular or the Wi-Fi network. Furthermore, the above-disclosed method also offers services without any change at the application or the server side and is a UE-side solution that does not modify any existing network protocol.

In an example, the module(s) and/or the unit(s) and/or model(s) may include a program, a subroutine, a portion of a program, a software component, or a hardware component capable of performing a stated task or function. As used herein, the module(s) and/or the unit(s) and/or model(s) may be implemented on a hardware component such as a server independently of other modules, or a module can exist with other modules on the same server, or within the same program. The module(s) and/or unit(s) and/or model(s) may be implemented on a hardware component such as processor one or more microprocessors, microcomputers, microcontrollers, digital signal processors, central processing units, state machines, logic circuitries, and/or any devices that manipulate signals based on operational instructions. The module(s) and/or unit(s) and/or model(s), when executed by the processor(s), may be configured to perform any of the described functionalities.

The various actions, acts, blocks, steps, or the like in the flow diagrams may be performed in the order presented, in a different order, or simultaneously. Further, in some embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A method performed by a user equipment (UE), the method comprising:
   identifying, based on a set of connection parameters, a plurality of parallel connections associated with an application for downloading or uploading of one or more contents;
   determining whether a bandwidth requirement of a connection included in the identified plurality of parallel connections is greater than a bandwidth threshold or not;

in accordance with a determination that the bandwidth requirement of the connection is greater than the bandwidth threshold:
    detecting per-connection-speed (PCS) of the connection, and
    assigning the connection to a first network interface or a second network interface based on the detected PCS of the connection; and
in accordance with a determination that the bandwidth requirement of the connection is not greater than the bandwidth threshold, assigning the connection to the second network interface.

2. The method of claim 1, wherein the set of connection parameters includes at least an application unique identifier (UID), a connection protocol associated with a connection, a destination internet protocol (IP), a destination port, and an IP type associated with the connection.

3. The method of claim 2, further comprising:
    obtaining historical data associated with the connection; and
    obtaining the bandwidth requirement of the connection based on the obtained historical data.

4. The method of claim 3, wherein the historical data includes, for each of the identified plurality of parallel connections, a record of the set of connection parameters, connection time, and amount of data transfer in past instances.

5. The method of claim 1, further comprising:
    determining at least one first parallel connection among the identified plurality of parallel connections whose bandwidth requirement is greater than the bandwidth threshold;
    classifying the at least one first parallel connection into a first category of connections;
    determining at least one second parallel connection among the identified plurality of parallel connections whose bandwidth requirement is not greater than the bandwidth threshold; and
    classifying the at least one second parallel connection into a second category of connections.

6. The method of claim 1, further comprising:
    determining at least one first parallel connection among the identified plurality of parallel connections whose data consumption rate is greater than a threshold value;
    classifying the at least one first parallel connection into a first category of connections;
    determining at least one second parallel connection among the identified plurality of parallel connections whose data consumption rate is less than the threshold value; and
    classifying the at least one second parallel connection into a second category of connections.

7. The method of claim 1, wherein the detecting of the PCS of the connection comprises:
    obtaining a first value of the PCS of the connection over the first network interface; and
    obtaining a second value of the PCS of the connection over the second network interface.

8. The method of claim 7, wherein the assigning of the connection to the first network interface or the second network interface comprises:
    determining whether the second value of the PCS of the connection over the second network interface is greater than the first value of the PCS of the connection over the first network interface or not;
    in accordance with a determination that the second value of the PCS of the connection over the second network interface is greater than the first value of the PCS of the connection over the first network interface, assigning the connection to the second network interface; and
    in accordance with a determination that the second value of the PCS of the connection over the second network interface is not greater than the first value of the PCS of the connection over the first network interface, assigning the connection to the first network interface.

9. The method of claim 1, wherein, for mobile data consumption, data cost caused by the first network interface is higher than data cost caused by the second network interface.

10. The method of claim 1,
    wherein the first network interface supports communication on cellular network, and
    wherein the second network interface supports communication on wireless fidelity (Wi-Fi) network.

11. A user equipment (UE) comprising:
    memory storing one or more instructions; and
    one or more processors communicatively coupled to the memory,
    wherein the one or more instructions, when executed by the one or more processors individually or collectively, cause the UE to:
        identify, based on a set of connection parameters, a plurality of parallel connections associated with an application for downloading or uploading of one or more contents,
        determine whether a bandwidth requirement of a connection included in the identified plurality of parallel connections is greater than a bandwidth threshold or not,
        in accordance with a determination that the bandwidth requirement of the connection is greater than the bandwidth threshold:
            detect per-connection-speed (PCS) of the connection, and
            assign the connection to a first network interface or a second network interface based on the detected PCS of the connection, and
        in accordance with a determination that the bandwidth requirement of the connection is not greater than the bandwidth threshold, assign the connection to the second network interface.

12. The UE of claim 11, wherein the set of connection parameters includes at least an application unique identifier (UID), a connection protocol associated with a connection, a destination internet protocol (IP), a destination port, and an IP type associated with the connection.

13. The UE of claim 12, wherein the one or more instructions, when executed by the one or more processors individually or collectively, cause the UE to:
    obtain historical data associated with the identified plurality of parallel connections, and
    obtain the bandwidth requirement of the connection based on the obtained historical data.

14. The UE of claim 13, wherein the historical data includes, for each of the identified plurality of parallel connections, a record of the set of connection parameters, connection time, and amount of data transfer in past instances.

15. The UE of claim 11, wherein the one or more instructions, when executed by the one or more processors individually or collectively, cause the UE to:

determine at least one first parallel connection among the identified plurality of parallel connections whose bandwidth requirement is greater than the bandwidth threshold, classify the at least one first parallel connection into a first category of connections, determine at least one second parallel connection among the identified plurality of parallel connections whose bandwidth requirement is less than the bandwidth threshold, and classify the at least one second parallel connection into a second category of connections.

16. The UE of claim 11, wherein, to detect the PCS of the connection, the one or more instructions, when executed by the one or more processors individually or collectively, cause the UE to:

obtain a first value of the PCS of the connection over the first network interface, and obtain a second value of the PCS of the connection over the second network interface.

17. The UE of claim 16, wherein, to assign the connection to the first network interface or the second network interface, the one or more instructions, when executed by the one or more processors individually or collectively, cause the UE to:

determine whether the second value of the PCS of the connection over the second network interface is greater than the first value of the PCS of the connection over the first network interface or not, in accordance with a determination that the second value of the PCS of the connection over the second network interface is greater than the first value of the PCS of the connection over the first network interface, assign the connection to the second network interface, and in accordance with a determination that the second value of the PCS of the connection over the second network interface is not greater than the first value of the PCS of the connection over the first network interface, assign the connection to the first network interface.

18. The UE of claim 11, wherein, for mobile data consumption, data cost caused by the first network interface is higher than data cost caused by the second network interface.

19. The UE of claim 11, wherein the first network interface supports communication on cellular network, and wherein the second network interface supports communication on wireless fidelity (Wi-Fi) network.

20. A non-transitory computer readable storage medium storing instructions that, when executed by at least one processor, cause a user equipment (UE) to:

identify, based on a set of connection parameters, a plurality of parallel connections associated with an application for downloading or uploading of one or more contents;

determine whether a bandwidth requirement of a connection included in the identified plurality of parallel connections is greater than a bandwidth threshold or not;

in accordance with a determination that the bandwidth requirement of the connection is greater than the bandwidth threshold:

detect per-connection-speed (PCS) of the connection, and assign the connection to a first network interface or a second network interface based on the detected PCS of the connection; and in accordance with a determination that the bandwidth requirement of the connection is not greater than the bandwidth threshold, assign the connection to the second network interface.

* * * * *